United States Patent
Onodera (10) Patent No.: US 11,496,172 B2
(45) Date of Patent: Nov. 8, 2022

(54) RADIO-FREQUENCY MODULE AND COMMUNICATION DEVICE

(71) Applicant: Murata Manufacturing Co., Ltd., Nagaokakyo (JP)

(72) Inventor: Syuichi Onodera, Nagaokakyo (JP)

(73) Assignee: MURATA MANUFACIURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/346,334

(22) Filed: Jun. 14, 2021

(65) Prior Publication Data

US 2021/0391883 A1 Dec. 16, 2021

(30) Foreign Application Priority Data

Jun. 15, 2020 (JP) .............................. JP2020-103266

(51) Int. Cl.
*H04B 1/16* (2006.01)

(52) U.S. Cl.
CPC ...................................... *H04B 1/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2019/0296708 A1* | 9/2019 | Takeuchi | ................. | H04B 1/40 |
| 2020/0007096 A1* | 1/2020 | Kita | ........................ | H01L 25/18 |
| 2020/0228151 A1 | 7/2020 | Naniwa et al. | | |
| 2021/0203372 A1* | 7/2021 | Yoshida | ................. | H04B 1/006 |
| 2021/0391880 A1* | 12/2021 | Onodera | .................. | H04B 1/10 |
| 2022/0109409 A1* | 4/2022 | Horita | ..................... | H01L 25/16 |

FOREIGN PATENT DOCUMENTS

| | | |
|---|---|---|
| JP | 2017-98630 A | 6/2017 |
| KR | 2003-0025438 A | 3/2003 |
| KR | 2020-0018624 A | 2/2020 |
| WO | 2018/168500 A1 | 9/2018 |

OTHER PUBLICATIONS

Office Action dated Apr. 16, 2022, in corresponding Korean patent Application No. 10-2021-0045687, 10 pages.

* cited by examiner

*Primary Examiner* — Thanh C Le
(74) *Attorney, Agent, or Firm* — Xsensus LLP (57) ABSTRACT

A radio-frequency module includes a module substrate having a first major surface and a second major surface, a first receive filter configured to pass a receive signal in a first communication band, a second receive filter configured to pass a receive signal in a second communication band, an antenna switch configured to control connection between the first receive filter and an antenna connection terminal and also control connection between the second receive filter and the antenna connection terminal, and a matching circuit coupled between the antenna connection terminal and the first receive filter. The matching circuit includes matching switches and at least one of an inductor and a capacitor. The first receive filter and the second receive filter are disposed at the first major surface. The antenna switch and the matching switches are included in a single semiconductor integrated circuit disposed at the second major surface.

19 Claims, 3 Drawing Sheets

RADIO-FREQUENCY MODULE AND COMMUNICATION DEVICE

CROSS-REFERENCE TO RELATED APPLICATION

The present application claims priority to Japanese patent application JP2020-103266, filed Jun. 15, 2020, the entire content of which being incorporated herein by reference.

BACKGROUND

1. Field

The present disclosure relates to a radio-frequency module and a communication device.

2. Description of the Related Art

In mobile communication devices, such as mobile phones, particularly along with the development of multiband communication, the arrangement of circuit elements constituting a radio-frequency front-end circuit has become complex.

Japanese Unexamined Patent Application Publication No. 2017-98630 (Patent Document 1) discloses a radio-frequency (front-end) module including a plurality of filters configured to pass radio-frequency signals in predetermined communication bands (frequency band), an antenna (input) switch coupled to the plurality of filters, and matching circuits coupled between the antenna switch and the filters. The matching circuit is constituted by at least one of an inductor and a capacitor. With this configuration, the radio-frequency module can simultaneously communicate radio-frequency signals in multiple communication bands.

SUMMARY

In the radio-frequency module disclosed in Patent Document 1, by optimizing the matching between the antenna and the plurality of filters in accordance with the combination of communication bands targeted for simultaneous communication, it is possible to reduce the communication loss of radio-frequency signal. To achieve this optimization, it is desirable that the matching circuits can be changed in accordance with the combination of communication bands targeted for simultaneous communication.

However, as recognized by the present inventor, when the matching circuits are configured to be changeable, the circuit configuration of the matching circuits are complex, and consequently, the size of the matching circuits and the size of the radio-frequency module are increased.

The present disclosure has been made to address the problem described above, as well as others, and provides a small radio-frequency module and a small communication device that can simultaneously communicate radio-frequency signals in multiple communication bands with low loss.

Thus, a radio-frequency module according to an aspect of the present disclosure includes a module substrate having a first major surface and a second major surface on opposite sides of the substrate with respect to each other, an antenna connection terminal, a first receive filter configured to pass a receive signal in a frequency band including a first communication band, a second receive filter configured to pass a receive signal in a frequency band including a second communication band different from the first communication band, an antenna switch configured to control connection and disconnection between the first receive filter and the antenna connection terminal and also control connection and disconnection between the second receive filter and the antenna connection terminal, and a matching circuit coupled between the antenna connection terminal and the first receive filter. The matching circuit includes at least one of an inductor and a capacitor and also includes a matching switch configured to control connection and disconnection between the first receive filter and the at least one of the inductor and the capacitor. The first receive filter and the second receive filter are disposed at the first major surface. The antenna switch and the matching switch are included in a single semiconductor integrated circuit disposed at the second major surface.

Other features, elements, characteristics, and advantages of the present disclosure will become more apparent from the following detailed description of embodiments of the present disclosure with reference to the attached drawings.

DESCRIPTION

Hereinafter, embodiments of the present disclosure will be described in detail. It should be noted that the embodiments described below are all specific or comprehensive instances. The numerical values, the shapes, the materials, the constituent elements, the arrangements of the constituent elements, and the modes of connection, and the like given in the following embodiments are mere instances and are not intended to limit the present disclosure. Among the constituent elements in the following embodiments and modified examples, constituent elements not recited in any of the independent claims are described as arbitrary constituent elements. Furthermore, the size or the size ratio of the constituent elements illustrated in the drawings is not necessarily presented in an exact manner. Like reference symbols are used to denote substantially like configurations in the drawings, and redundant descriptions thereof may be omitted or simplified.

In the following description, words used to express relationships between elements, such as parallel and vertical, words used to express the shape of an element, such as rectangular, and numerical ranges do not necessarily denote the exact meanings but denote substantially the same meanings involving, for example, several percent differences.

Further, in the following description, the sentence "when the substrate (or the major surface of the substrate) is viewed in plan view, C is disposed between A and B" denotes that the region occupied by C is intersected by at least one of the line segments connecting points within A and points within B when the substrate is viewed in plan view. The plan view of a substrate denotes that the substrate and circuit elements mounted on the substrate are viewed in the state in which the substrate and circuit elements are orthogonally projected on a plane parallel to the major surface of the substrate.

Furthermore, in the following description, "transmit path" denotes a communication line constituted by, for example, a wiring through which a radio-frequency transmit signal travels, an electrode directly coupled to the wiring, and a terminal directly coupled to the wiring or the electrode. Similarly, "receive path" denotes a communication line constituted by, for example, a wiring through which a radio-frequency receive signal travels, an electrode directly coupled to the wiring, and a terminal directly coupled to the wiring or the electrode. Similarly, "transmit and receive path" denotes a communication line constituted by, for example, a wiring through which a radio-frequency transmit signal and a radio-frequency receive signal travel, an electrode directly coupled to the wiring, and a terminal directly coupled to the wiring or the electrode.

Embodiment

1. Circuit configuration of radio-frequency module 1 and communication device 5

Figure 1:
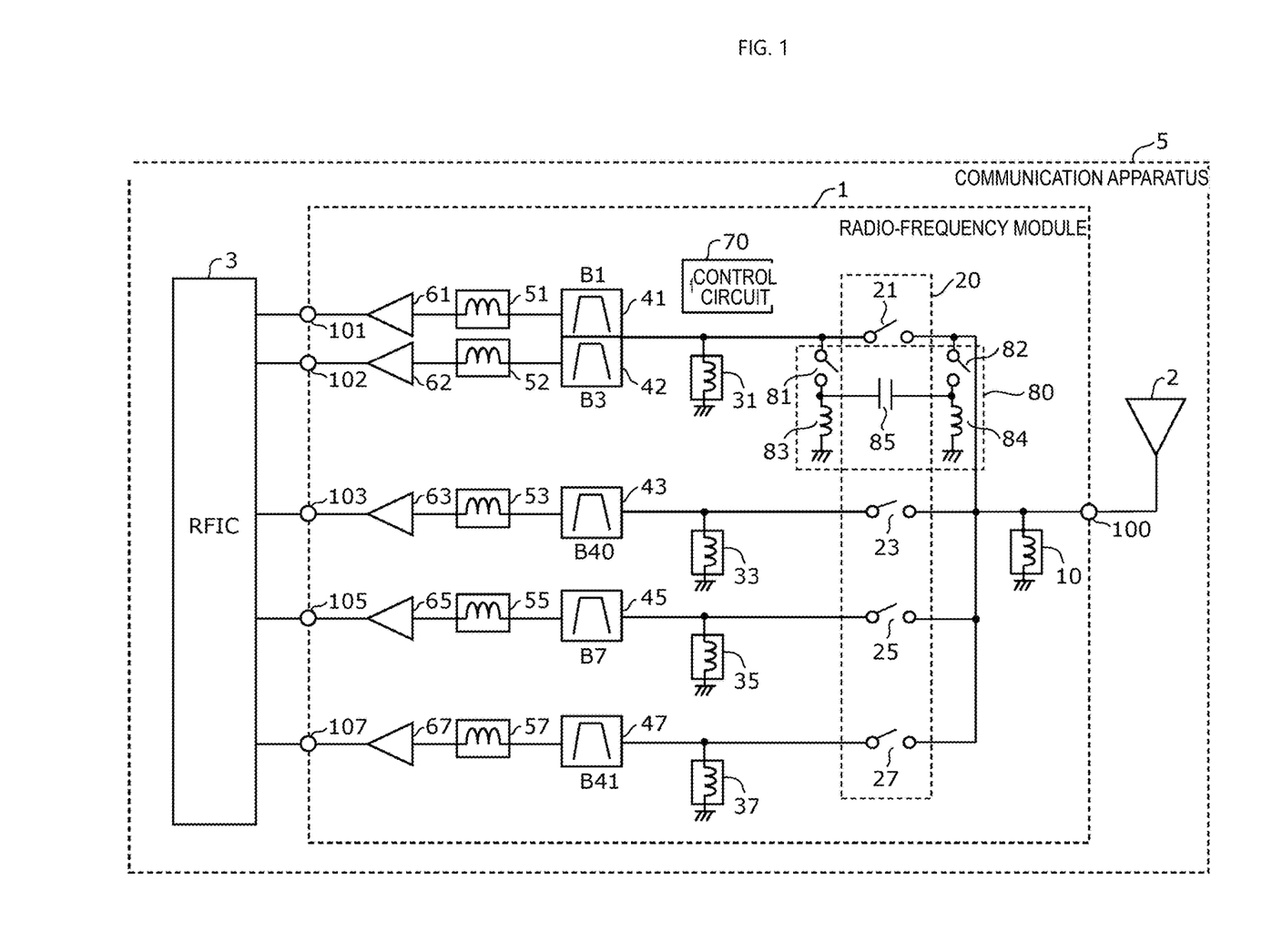
FIG. 1 is a circuit configuration diagram of a radio-frequency module (or RF front-end circuitry) and a communication device according to the embodiment.

FIG. 1 is a circuit configuration diagram of a radio-frequency module 1 and a communication device 5 according to an embodiment. As illustrated in the drawing, the communication device 5 includes the radio-frequency module 1, an antenna 2, and a radio frequency signal processing circuit (RFIC) 3. In this exemplary configuration the communication apparatus 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

The RFIC 3 is a radio frequency signal processing circuit configured to process a radio-frequency signal received or to be transmitted by the antenna 2. Specifically, the RFIC 3 processes a receive signal inputted through a receive path of the radio-frequency module 1 by performing, for example, downconversion and outputs the processed receive signal generated by the signal processing to a baseband signal processing circuit (not illustrated in the drawing).

The RFIC 3 also functions as a controller for controlling the connection of an antenna switch 20 and the connection of matching switches 81 and 82 included in the radio-frequency module 1 in accordance with information about, for example, the communication band (frequency band) that is used. Specifically, the RFIC 3 controls connection of the antenna switch 20 and connection of the matching switches 81 and 82 included in the radio-frequency module 1 by using a control signal. Specifically, the RFIC 3 outputs to a control circuit 70, for example, digital control signals for controlling the antenna switch 20 and the matching switches 81 and 82 such as mobile industry processor interface (MIPI) and general-purpose input/output (GPIO) signals. The control circuit 70 controls connection and disconnection of the antenna switch 20 and connection and disconnection of the matching switches 81 and 82 by, for example, outputting digital control signals to the antenna switch 20 and the matching switches 81 and 82 in accordance with the digital control signals inputted by the RFIC 3. It should be noted that the RFIC 3 may output an analog control signal.

The RFIC 3 also functions as a controller for controlling the gain of the low-noise amplifiers 61, 62, 63, 65, and 67 (hereinafter also referred to as the low-noise amplifiers 61 to 67) included in the radio-frequency module 1 and a supply voltage Vcc and a bias voltage Vbias that are supplied to the low-noise amplifiers 61 to 67. Specifically, the RFIC 3 outputs to the control circuit 70 digital control signals such as MIPI and GPIO signals. The control circuit 70 controls the gain of the low-noise amplifiers 61 to 67 by outputting a control signal, the supply voltage Vcc, or the bias voltage Vbias to the low-noise amplifiers 61 to 67 in accordance with the digital control signal inputted by the RFIC 3. It should be noted that a constituent element configured to function as the controller may be provided outside the RFIC 3.

The antenna 2 is coupled to an antenna connection terminal 100 of the radio-frequency module 1. The antenna 2 receives a radio-frequency signal from outside and outputs the radio-frequency signal to the radio-frequency module 1.

In the communication device 5 according to the present embodiment, the antenna 2 is a non-essential constituent element.

Next, details of the configuration of the radio-frequency module 1 will be described.

As illustrated in FIG. 1, the radio-frequency module 1 includes the antenna connection terminal 100, receive filters 41, 42, 43, 45, and 47 (hereinafter also referred to as the receive filters 41 to 47), the low-noise amplifiers 61 to 67, the antenna switch 20, matching circuits 10, 31, 33, 35, 37, 51, 52, 53, 55, 57, and 80, and the control circuit 70.

The antenna connection terminal 100 is coupled to the antenna 2.

The receive filter 41 is an example of a first receive filter. The receive filter 41 is disposed in a receive path connecting the antenna connection terminal 100 and a receive output terminal 101. Of the receive signals inputted from the antenna connection terminal 100, the receive filter 41 passes receive signals in a frequency band including a receive band (downlink operating band) of a first communication band. The first communication band is, for example, Band 1 (receive frequency range: 2110-2170 MHz) of Long Term Evolution (LTE). An input terminal of the receive filter 41 is coupled to one terminal of a switch 21. An output terminal of the receive filter 41 is coupled to an input terminal of the low-noise amplifier 61 via the matching circuit 51. The first communication band may be, for example, LTE Band 3 (receive frequency range: 2110-2170 MHz), Band 40 (receive frequency range: 2300-2400 MHz), Band 7 (receive frequency range: 2620-2690 MHz), or Band 41 (receive frequency range: 2496-2690 MHz).

The receive filter 42 is disposed in a receive path connecting the antenna connection terminal 100 and a receive output terminal 102. Of the receive signals inputted from the antenna connection terminal 100, the receive filter 42 passes receive signals in a frequency band including a receive band of a third communication band different from the first communication band. The third communication band is, for example, LTE Band 3. An input terminal of the receive filter 42 is coupled to the one terminal of the switch 21. An output terminal of the receive filter 42 is coupled to an input terminal of the low-noise amplifier 62 via the matching circuit 52. With the connection configuration described above, the receive filters 41 and 42 form a first multiplexer.

The receive filter 43 is an example of a second receive filter. The receive filter 43 is disposed in a receive path connecting the antenna connection terminal 100 and a receive output terminal 103. Of the receive signals inputted from the antenna connection terminal 100, the receive filter 43 passes receive signals in a frequency band including a second communication band different from the first communication band. The second communication band is, for example, LTE Band 40. An input terminal of the receive filter 43 is coupled to one terminal of a switch 23. An output terminal of the receive filter 43 is coupled to an input terminal of the low-noise amplifier 63 via the matching circuit 53. The second communication band may be, for example, LTE Band 1, Band 3, Band 7, or Band 41.

The receive filter 45 is disposed in a receive path connecting the antenna connection terminal 100 and a receive output terminal 105. Of the receive signals inputted from the antenna connection terminal 100, the receive filter 45 passes receive signals in a frequency band including a receive band of a fourth communication band. The fourth communication band is, for example, LTE Band 7. An input terminal of the receive filter 45 is coupled to one terminal of a switch 25. An output terminal of the receive filter 45 is coupled to an input terminal of the low-noise amplifier 65 via the matching circuit 55.

The receive filter 47 is disposed in a receive path connecting the antenna connection terminal 100 and a receive output terminal 107. Of the receive signals inputted from the antenna connection terminal 100, the receive filter 47 passes receive signals in a frequency band including a receive band of a fifth communication band. The fifth communication band is, for example, LTE Band 41. An input terminal of the receive filter 47 is coupled to one terminal of a switch 27. An output terminal of the receive filter 47 is coupled to an input terminal of the low-noise amplifier 67 via the matching circuit 57.

The receive filters 41 to 47 may each form a duplexer configured to communicate transmit and receive signals by using a frequency division duplex (FDD) system in association with a transmit filter configured to pass a transmit signal. The receive filters 41 to 47 may be receive filters used when transmit and receive signals are communicated by using a time division duplex (TDD) system.

The receive filters 41 to 47 may be, but not limited to, acoustic wave filters using a surface acoustic wave (SAW), acoustic wave filters using a bulk acoustic wave (BAW), LC resonance filters, or dielectric filters.

The low-noise amplifier 61 is a receive amplifier capable of amplifying receive signals in the first communication band with low noise and is configured to output the amplified receive signals to the receive output terminal 101. The low-noise amplifier 62 is a receive amplifier capable of amplifying receive signals in the third communication band with low noise and is configured to output the amplified receive signals to the receive output terminal 102. The low-noise amplifier 63 is a receive amplifier capable of amplifying receive signals in the second communication band with low noise and is configured to output the amplified receive signals to the receive output terminal 103. The low-noise amplifier 65 is a receive amplifier capable of amplifying receive signals in the fourth communication band with low noise and is configured to output the amplified receive signals to the receive output terminal 105. The low-noise amplifier 67 is a receive amplifier capable of amplifying receive signals in the fifth communication band with low noise and is configured to output the amplified receive signals to the receive output terminal 107. In the following description, the receive output terminals 101, 102, 103, 105, and 107 are also referred to as the receive output terminals 101 to 107.

The low-noise amplifiers 61 to 67 are constituted by, for example, field-effect transistors (FETs) or heterojunction bipolar transistors (HBTs) made by using a Si complementary metal oxide semiconductor (CMOS) or GaAs.

The antenna switch 20 includes the switches 21, 23, 25, and 27 that are single-pole single-throw (SPST) switches. The other terminal of the switch 21, the other terminal of the switch 23, the other terminal of the switch 25, and the other terminal of the switch 27 are coupled to the antenna connection terminal 100 via the matching circuit 10. The switch 21 controls connection and disconnection between the antenna connection terminal 100 and the first multiplexer. The switch 23 controls connection and disconnection between the antenna connection terminal 100 and the receive filter 43. The switch 25 controls connection and disconnection between the antenna connection terminal 100 and the receive filter 45. The switch 27 controls connection and disconnection between the antenna connection terminal 100 and the receive filter 47. With this configuration, the antenna switch 20 is configured to: (1) control connection and disconnection between the first multiplexer and the antenna connection terminal 100; (2) control connection and disconnection between the receive filter 43 and the antenna connection terminal 100; (3) control connection and disconnection between the receive filter 45 and the antenna connection terminal 100; (4) control connection and disconnection between the receive filter 47 and the antenna connection terminal 100. The number of switches included in the antenna switch 20 is appropriately set in accordance with the number of signal paths included in the radio-frequency module 1.

The matching circuit 10 is an example of an impedance matching circuit. The matching circuit 10 is disposed in a receive path connecting the antenna connection terminal 100 and the antenna switch 20 and configured to match the impedance of the antenna 2 and the impedance of the antenna switch 20.

The matching circuit 31 is coupled between the antenna switch 20 and an input terminal of the first multiplexer and configured to match the impedance of the antenna switch 20 and the impedance of the first multiplexer. The matching circuit 33 is coupled between the antenna switch 20 and the input terminal of the receive filter 43 and configured to match the impedance of the antenna switch 20 and the impedance of the receive filter 43. The matching circuit 35 is coupled between the antenna switch 20 and the input terminal of the receive filter 45 and configured to match the impedance of the antenna switch 20 and the impedance of the receive filter 45. The matching circuit 37 is coupled between the antenna switch 20 and the input terminal of the receive filter 47 and configured to match the impedance of the antenna switch 20 and the impedance of the receive filter 47. In the following description, the matching circuits 31, 33, 35, and 37 are also referred to as the matching circuits 31 to 37.

The matching circuit 51 is coupled between the input terminal of the low-noise amplifier 61 and the output terminal of the receive filter 41 and configured to match the impedance of the low-noise amplifier 61 and the impedance of the receive filter 41. The matching circuit 52 is coupled between the input terminal of the low-noise amplifier 62 and the output terminal of the receive filter 42 and configured to match the impedance of the low-noise amplifier 62 and the impedance of the receive filter 42. The matching circuit 53 is coupled between the input terminal of the low-noise amplifier 63 and the output terminal of the receive filter 43 and configured to match the impedance of the low-noise amplifier 63 and the impedance of the receive filter 43. The matching circuit 55 is coupled between the input terminal of the low-noise amplifier 65 and the output terminal of the receive filter 45 and configured to match the impedance of the low-noise amplifier 65 and the impedance of the receive filter 45. The matching circuit 57 is coupled between the input terminal of the low-noise amplifier 67 and the output terminal of the receive filter 47 and configured to match the impedance of the low-noise amplifier 67 and the impedance of the receive filter 47. In the following description, the matching circuits 51, 52, 53, 55, and 57 are also referred to as the matching circuits 51 to 57.

The matching circuits 10, 31 to 37, and 51 to 57 are each constituted by at least one of an inductor and a capacitor.

The matching circuits 10, 31 to 37, and 51 to 57 may be each coupled between the corresponding receive path and the ground, disposed in series with the corresponding receive path, or disposed between the corresponding receive path and the ground and in the corresponding receive path.

The matching circuit 80 is coupled between the antenna connection terminal 100 and the receive filter 41. The matching circuit 80 includes inductors 83 and 84, a capacitor 85, and the matching switches 81 and 82.

Two ends of the capacitor 85 are respectively coupled to one end of the inductor 83 and one end of the inductor 84. The other end of the inductor 83 and the other end of the inductor 84 are coupled to the ground. One terminal of the matching switch 81 is coupled to a receive path connecting the one terminal of the switch 21 and the first multiplexer. The other terminal of the matching switch 81 is coupled to the one end of the inductor 83. One terminal of the matching switch 82 is coupled to a receive path connecting the other terminal of the switch 21 and the antenna connection terminal 100. The other terminal of the matching switch 82 is coupled to the one end of the inductor 84.

With the connection configuration described above, in the matching circuit 80, a high-pass phase shift circuit of a shunt L-series C-shunt L arrangement is connected to a receive path connecting the antenna connection terminal 100 and the first multiplexer by closing the matching switches 81 and 82. Conversely, in the matching circuit 80, the phase shift circuit is disconnected from the receive path by opening the matching switches 81 and 82.

The matching switches 81 and 82 are not necessarily coupled separately on both sides of the switch 21; the matching switches 81 and 82 may be together coupled on either one terminal side or the other terminal side of the switch 21. The phase shift circuit is not necessarily a high-pass circuit of a shunt L-series C-shunt L arrangement but may include at least either an inductor or a capacitor.

The matching circuit 80 may also be coupled to the input terminal of the receive filter 43. In this case, for example, a switch is coupled between the input terminal of the receive filter 43 and a connection node between the matching switch 81 and the inductor 83. With this configuration, in the matching circuit 80, closing the switch establish connection between the phase shift circuit and a receive path connecting the antenna connection terminal 100 and the receive filter 43.

In accordance with digital control signals such as MIPI and GPIO signals inputted by the RFIC 3, the control circuit 70 controls connection and disconnection of the antenna switch 20 and connection and disconnection of the matching switches 81 and 82 and adjusts the gain of the low-noise amplifiers 61 to 67.

The antenna switch 20 and the matching switches 81 and 82 are included in a single-chip semiconductor integrated circuit (IC). The semiconductor IC is constituted by, for example, a CMOS. Specifically, the semiconductor IC is formed by a silicon on insulator (SOI) process. Thus, it is possible to inexpensively manufacture the semiconductor IC. The semiconductor IC may be formed of at least any of GaAs, SiGe, and GaN. With this configuration, it is possible to output radio-frequency signals with high amplification performance and low-noise performance when the semiconductor IC includes an amplifier.

Additionally, the semiconductor IC may include at least one of the control circuit 70 and the low-noise amplifiers 61 to 67.

In the configuration of the radio-frequency module 1, the switch 21, the matching circuit 80, the matching circuit 31, the receive filter 41, the matching circuit 51, and the low-noise amplifier 61 together form a first receive circuit configured to communicate a receive signal in the first communication band inputted from the antenna 2 through the antenna connection terminal 100. The switch 21, the matching circuit 80, the matching circuit 31, the receive filter 42, the matching circuit 52, and the low-noise amplifier 62 together form a third receive circuit configured to communicate a receive signal in the third communication band inputted from the antenna 2 through the antenna connection terminal 100. The switch 23, the matching circuit 33, the receive filter 43, the matching circuit 53, and the low-noise amplifier 63 together form a second receive circuit configured to communicate a receive signal in the second communication band inputted from the antenna 2 through the antenna connection terminal 100. The switch 25, the matching circuit 35, the receive filter 45, the matching circuit 55, and the low-noise amplifier 65 together form a fourth receive circuit configured to communicate a receive signal in the fourth communication band inputted from the antenna 2 through the antenna connection terminal 100. The switch 27, the matching circuit 37, the receive filter 47, the matching circuit 57, and the low-noise amplifier 67 together form a fifth receive circuit configured to communicate a receive signal in the fifth communication band inputted from the antenna 2 through the antenna connection terminal 100.

With the circuit configuration described above, the radio-frequency module 1 can receive a radio-frequency signal in any of the first to fifth communication bands. Furthermore, the radio-frequency module 1 can simultaneously receive radio-frequency signals in two or more bands of the first to fifth communication bands.

In the radio-frequency module 1, for example, (1) when a receive signal in the first communication band is solely received, (2) when a receive signal in the third communication band is solely received, or (3) when a receive signal in the first communication band and a receive signal in the third communication band are simultaneously received, the matching switches 81 and 82 are open. By contrast, (4) when a receive signal in the first communication band, a receive signal in the third communication band, and a receive signal in the fourth communication band are simultaneously received, (5) when a receive signal in the first communication band, a receive signal in the second communication band, a receive signal in the third communication band, and a receive signal in the fourth communication band are simultaneously received, or (6) when a receive signal in the first communication band, a receive signal in the third communication band, and a receive signal in the fifth communication band are simultaneously received, the matching switches 81 and 82 are closed.

With this configuration, the matching circuit 80 functions as a phase shift circuit for changing the phase of the matching circuit 80 in accordance with the receive conditions (1) to (6), and as a result, the radio-frequency module 1 can communicate receive signals with low loss in any case of (1) to (6).

It should be noted that the radio-frequency module according to the present disclosure only needs to include the first and second receive circuits and the antenna switch 20.

The radio-frequency module according to the present disclosure may include transmit circuits respectively corresponding to the first to fifth receive circuits. The transmit circuit is constituted by, for example, a power amplifier configured to amplify a transmit signal, a transmit filter configured to pass the transmit signal, and a matching circuit.

When the radio-frequency module 1 is a small front-end circuit, the matching circuit 80 is changed in accordance with the combination of communication bands targeted for simultaneous communication to optimize matching between the antenna 2 and the receive filters 41 to 47, and as a result, it is possible to reduce the communication loss of radio-frequency signal. However, when the matching circuit 80 is changeable, the circuit configuration is complex because the matching circuit 80 includes inductors, a capacitor, and matching switches; and thus, it is difficult to downsize the matching circuit 80 and the radio-frequency module 1. In this regard, the following describes a configuration of the radio-frequency module 1 of a small size that can simultaneously communicate radio-frequency signals in multiple communication bands with low loss.

Figure 2A:
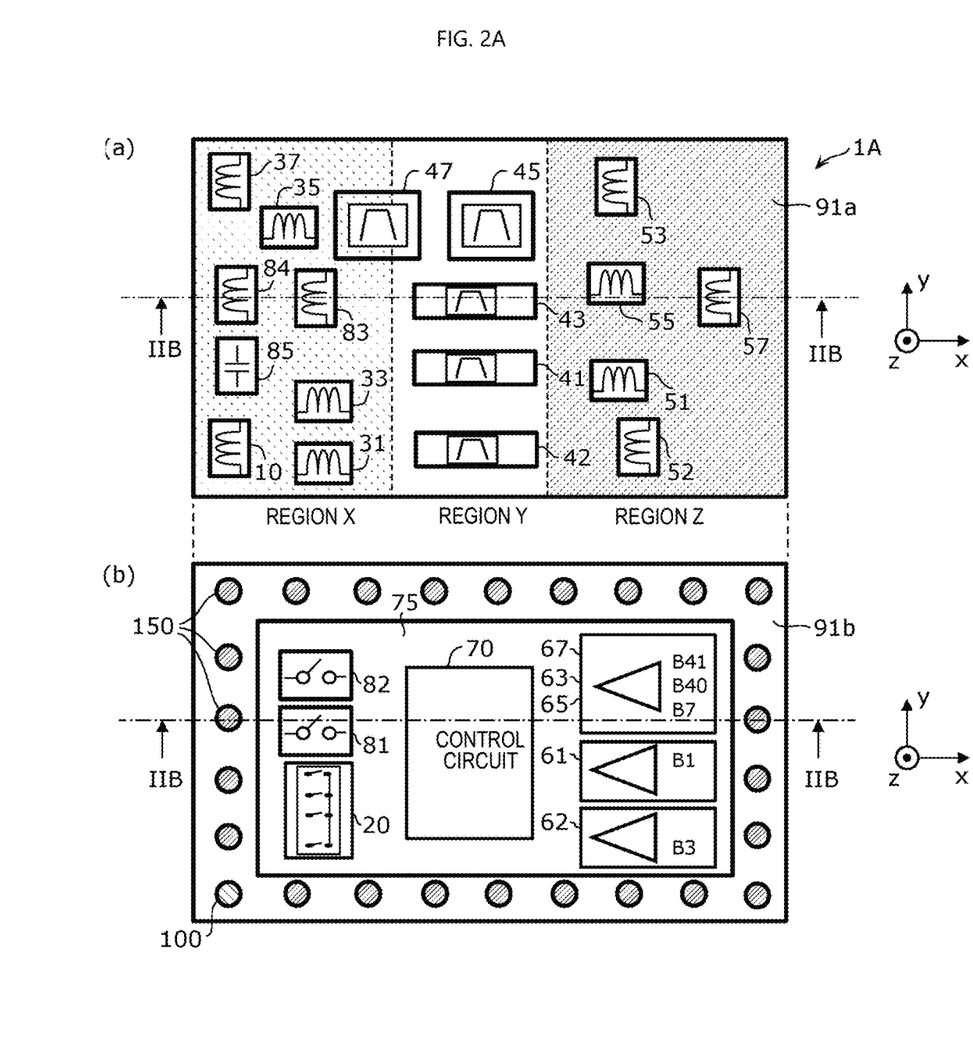
FIG. 2A provides schematic diagrams of planar configuration of a radio-frequency module according to a practical example.
Figure 2B:
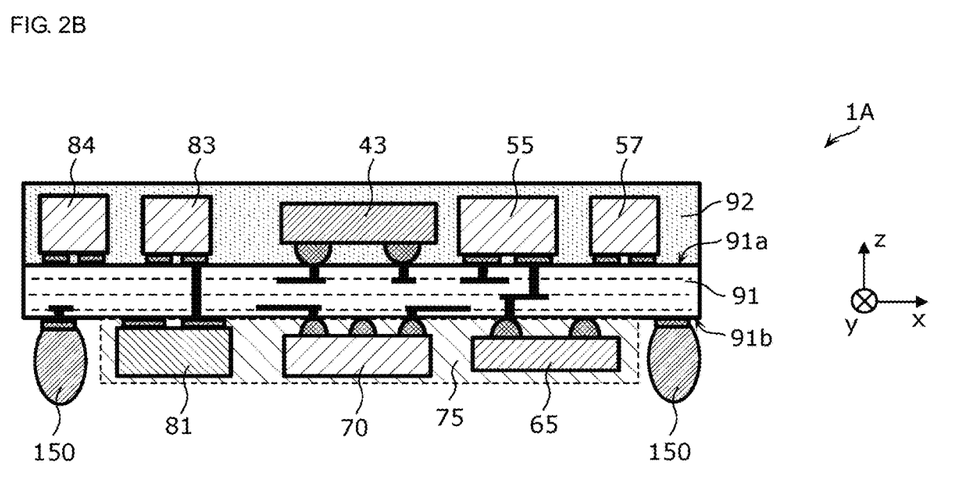
FIG. 2B is a schematic diagram of a sectional configuration of the radio-frequency module according to the practical example.

2. Arrangement of circuit elements of radio-frequency module 1A according to practical example FIG. 2A provides schematic diagrams of planar configuration of a radio-frequency module 1A according to a practical example. FIG. 2B is a schematic diagram of a sectional configuration of the radio-frequency module 1A according to the practical example, more specifically, a sectional view taken along line IIB-IIB in FIG. 2A. In FIG. 2A, (a) illustrates an arrangement of circuit elements when a major surface 91a of a module substrate 91 is viewed in the forward direction of the Z axis; (b) illustrates a transparent view of an arrangement of circuit elements when a major surface 91b of the module substrate 91, which is opposite to the major surface 91a, is viewed in the forward direction of the Z axis.

The radio-frequency module 1A according to the practical example specifically presents the arrangement of the circuit components of the radio-frequency module 1 according to the embodiment.

As illustrated in FIGS. 2A and 2B, the radio-frequency module 1A according to the practical example includes, in addition to the circuit configuration illustrated in FIG. 1, the module substrate 91, a resin member 92, and external connection terminals 150.

The module substrate 91 has the major surface 91a (first major surface) and the major surface 91b (second major surface) opposite to each other. At the module substrate 91, the receive circuit described above is provided. As the module substrate 91, for example, a low temperature co-fired ceramics (LTCC) substrate having a layered structure composed of a plurality of dielectric layers, a high temperature co-fired ceramics (HTCC) substrate, a component-embedded substrate, a substrate including a redistribution layer (RDL), or a printed board is used.

The resin member 92 is disposed on the major surface 91a of the module substrate 91 to cover a part of the receive circuit and the major surface 91a of the module substrate 91. The resin member 92 has a function of reliably securing, for example, the mechanical strength and moisture resistance of the circuit elements constituting the receive circuit. It should be noted that the resin member 92 is not a constituent element essential for the radio-frequency module according to the present disclosure.

As illustrated in FIGS. 2A and 2B, in the radio-frequency module 1A according to the practical example, the receive filters 41 to 47, the matching circuit 10, the matching circuits 31 to 37, and the matching circuits 51 to 57 are arranged at the major surface 91a (first major surface). The antenna switch 20, the matching switches 81 and 82, the control circuit 70, and the low-noise amplifiers 61 to 67 are arranged at the major surface 91b (second major surface). At least a part of the receive filters 41, 42, 43, 45, and 47 are arranged in a region Y sandwiched between a region X where the matching circuit 10 and the matching circuits 31, 33, 35 and 37 are arranged, and a region Z where the matching circuits 51, 52, 53, 55 and 57 are arranged. The control circuit 70 is disposed between the antenna switch 20 and the low noise amplifiers 61-67. Further, a footprint of the region X and the antenna switch 20 overlap at least partially. Likewise, a footprint of the region Z and the low-noise amplifiers 61-67 overlap at least partially.

The antenna switch 20, the matching switches 81 and 82, the control circuit 70, and the low-noise amplifiers 61 to 67 are included in a semiconductor IC 75 disposed at the major surface 91b.

Wirings serving as the receive paths connecting the circuit components illustrated in FIG. 1, which are not illustrated in FIG. 2A, are formed inside the module substrate 91, and at the major surfaces 91a and 91b. The wiring may be a bonding wire having ends connected to the major surface 91a or 91b, and any of the circuit elements constituting the radio-frequency module 1A. Alternatively, the wiring may be a terminal, an electrode, or a wiring formed at a surface of any of the circuit elements constituting the radio-frequency module 1A. The structure in which the semiconductor IC includes the circuit elements is defined as the structure in which circuit elements are formed at a surface of a single semiconductor substrate or inside the single semiconductor substrate or the structure in which circuit elements are integrated in a single package. The single semiconductor substrate and the single package are different from the module substrate 91 and also different from an external substrate at which the radio-frequency module 1A is disposed.

Since with this configuration the circuit components constituting the radio-frequency module 1A are separately arranged at the major surfaces 91a and 91b of the module substrate 91, it is possible to downsize the radio-frequency module 1A. Further, at the major surface 91b, the antenna switch 20 and the matching switches 81 and 82 constituting the matching circuit 80 are integrated in the semiconductor IC 75. As a result, it is possible to provide the radio-frequency module 1A of a small size that can simultaneously communicate radio-frequency signals in multiple communication bands with low loss. Furthermore, since the control circuit 70 and the low-noise amplifiers 61 to 67 are integrated together with the antenna switch 20 and the matching switches 81 and 82 in the semiconductor IC 75 at the major surface 91b, it is possible to reduce the area of the major surface 91b and achieve a low-profile structure at the major surface 91b.

The major surface 91a needs to include at least the receive filters 41 and 43, and other receive filters, the matching circuit 10, the matching circuits 31 to 37, and the matching circuits 51 to 57 may be arranged at the major surface 91b. The semiconductor IC 75 does not necessarily include the control circuit 70 and the low-noise amplifiers 61 to 67.

In the radio-frequency module 1A according to the practical example, the inductors 83 and 84 and the capacitor 85, which constitute the matching circuit 80, are arranged at the major surface 91a.

As such, the constituent elements of the matching circuit 80 such as the matching switches 81 and 82, the inductors 83 and 84, and the capacitor 85 are separately arranged at both surfaces of the module substrate 91, and thus, it is possible to further downsize the radio-frequency module 1A.

Moreover, in the radio-frequency module 1A according to the practical example, when the module substrate 91 is viewed in plan view, at least one of the inductors 83 and 84 and the capacitor 85 at least partially coincide (overlap) with the matching switches 81 and 82.

With this configuration, the inductors 83 and 84 and the capacitor 85, which constitute the matching circuit 80, face the matching switches 81 and 82, which constitute the matching circuit 80, with the module substrate 91 interposed between the inductors 83 and 84 and the capacitor 85 and the matching switches 81 and 82, and as a result, wirings in the matching circuit 80 can be shortened. Consequently, it is possible to reduce communication loss of receive signal when the matching switches 81 and 82 are closed.

The radio-frequency module 1A communicates electrical signals with the external substrate disposed at a position in the reverse direction of the Z axis of the radio-frequency module 1A through the external connection terminals 150. As illustrated in (b) of FIG. 2A, the external connection terminals 150 include the antenna connection terminal 100 and the receive output terminals 101 to 107 (not indicated in (b) of FIG. 2A). Some of the external connection terminals 150 are set to a ground potential of the external substrate.

At the major surface 91b facing the external substrate, the inductors 83 and 84, the capacitor 85, the matching circuits 31 to 37, the matching circuits 51 to 57, and the receive filters 41 to 47, which cannot be easily formed as low-profile structures, are not arranged; but the matching switches 81 and 82, the antenna switch 20, the control circuit 70, and the low-noise amplifiers 61 to 67, which can be easily formed as low-profile structures, are arranged, and as a result, it is possible to form the entire radio-frequency module 1A as a low-profile structure. Moreover, since some external connection terminals 150 serving as ground electrodes are arranged around the low-noise amplifiers 61 to 67, which greatly affect the receive sensitivity of the first to fifth receive circuits, it is possible to suppress degradation of the receive sensitivity of the first to fifth receive circuits.

It is desirable that the module substrate 91 have a multilayer structure formed by layering a plurality of dielectric layers, and a ground electrode pattern be formed at at least one of the plurality of dielectric layers. This configuration improves the module substrate 91 with respect to the capability of blocking the electromagnetic field.

In the radio-frequency module 1A, the external connection terminals 150 may be bump electrodes as illustrated in FIG. 2B, or the external connection terminals 150 may be, for example, columnar electrodes elongated from the major surface 91b in the reverse direction of the Z axis. In either case, a resin member may be provided to cover the major surface 91b.

3. Effect

As described above, the radio-frequency module 1 according to the present embodiment includes the module substrate 91 having the major surfaces 91a and 91b opposite to each other, the antenna connection terminal 100, the receive filter 42 configured to pass a receive signal in a frequency band including the first communication band, the receive filter 43 configured to pass a receive signal in a frequency band including the second communication band different from the first communication band, the antenna switch 20 configured to control connection and disconnection between the receive filter 41 and the antenna connection terminal 100 and also control connection and disconnection between the receive filter 43 and the antenna connection terminal 100, and the matching circuit 80 coupled between the antenna connection terminal 100 and the receive filter 41. The matching circuit 80 includes at least one of the inductor and capacitor and also includes the matching switches 81 and 82 configured to control connection and disconnection between the at least one of the inductor and capacitor and the receive filter 41. The receive filters 41 and 43 are arranged at the major surface 91a. The antenna switch 20 and the matching switches 81 and 82 are included in the single semiconductor IC 75 disposed at the major surface 91b.

Since with this configuration the circuit components constituting the radio-frequency module 1 are separately arranged at the major surfaces 91a and 91b of the module substrate 91, it is possible to downsize the radio-frequency module 1. Further, at the major surface 91b, the antenna switch 20 and the matching switches 81 and 82 constituting the matching circuit 80 are integrated in the semiconductor IC 75. As a result, it is possible to provide the radio-frequency module 1 of a small size that can simultaneously communicate radio-frequency signals in multiple communication bands with low loss.

In the radio-frequency module 1, at least one of the inductor and capacitor constituting the matching circuit 80 may be disposed at the major surface 91a.

As such, the constituent elements of the matching circuit 80 such as the matching switches 81 and 82 and the at least one of the inductor and capacitor are separately arranged at both surfaces of the module substrate 91, and thus, it is possible to further downsize the radio-frequency module 1.

Further, in the radio-frequency module 1, when the module substrate 91 is viewed in plan view, the at least one of the inductor and capacitor may at least partially coincide with the matching switches 81 and 82.

With this configuration, the at least one of the inductor and capacitor faces the matching switches 81 and 82 with the module substrate 91 interposed between the at least one of the inductor and capacitor and the matching switches 81 and 82, and as a result, wirings in the matching circuit 80 can be shortened. Consequently, it is possible to reduce communication loss of receive signal when the matching switches 81 and 82 are closed.

Furthermore, the radio-frequency module 1 may further include the external connection terminals 150 arranged at the major surface 91b.

At the major surface 91b facing the external substrate, the matching circuits 31 to 37, the matching circuits 51 to 57, and the receive filters 41 to 47, which cannot be easily formed as low-profile structures, are not arranged; but the antenna switch 20 and the matching switches 81 and 82, which can be easily formed as low-profile structures, are arranged, and as a result, it is possible to form the entire radio-frequency module 1 as a low-profile structure.

In the radio-frequency module 1, when a receive signal in the first communication band is solely received, the matching switches 81 and 82 may be open; when a receive signal in the first communication band and a receive signal in the second communication band are simultaneously received, the matching switches 81 and 82 may be closed.

With this configuration, the matching circuit 80 functions as a phase shift circuit for changing the phase of the matching circuit 80 in accordance with the receive conditions of receive signal, and as a result, the radio-frequency module 1 can communicate receive signals with low loss in any case of the receive conditions described above.

Furthermore, in the radio-frequency module 1, the receive filter 41 and 43 may each pass a signal in LTE Band 1, Band 3, Band 7, Band 40, or Band 41.

Moreover, the communication device 5 includes the antenna 2, the RFIC 3 configured to process a radio-frequency signal received by the antenna 2, and the radio-frequency module 1 configured to communicate the radio-frequency signal between the antenna 2 and the RFIC 3.

As a result, it is possible to provide the communication device 5 of a small size that can simultaneously communicate radio-frequency signals in multiple communication bands with low loss.

Other Embodiments

While the radio-frequency module and communication device according to the embodiment of the present disclosure have been described above by using the embodiment and practical example, the radio-frequency module and communication device according to the present disclosure are not limited to the embodiment and practical example described above. The present disclosure also embraces other embodiments implemented as any combination of the constituent elements of the embodiment and practical example, other modified examples obtained by making various modifications that occur to those skilled in the art without departing from the scope of the embodiment and practical example described above, and various hardware devices including the radio-frequency module and communication device.

For example, in the radio-frequency module and communication device according to the embodiment and practical example described above, another circuit element or another wiring may be inserted between the circuit components or the paths connecting a signal path that are illustrated in the drawings.

The present disclosure can be widely used for communication devices such as mobile phones as a radio-frequency module configured to support multiple bands and to be provided in the front-end.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency module comprising:
a module substrate having a first major surface and a second major surface on opposing sides of the module substrate;
an antenna connection terminal;
a first receive filter configured to pass a receive signal in a frequency band including a first communication band;
a second receive filter configured to pass a receive signal in a frequency band including a second communication band different from the first communication band;
an antenna switch configured to control connection and disconnection between the first receive filter and the antenna connection terminal and also control connection and disconnection between the second receive filter and the antenna connection terminal; and
a matching circuit coupled between the antenna connection terminal and the first receive filter, wherein
the matching circuit includes
at least one of an inductor and a capacitor, and
a matching switch configured to control connection and disconnection between the first receive filter and the at least one of the inductor and the capacitor,
the first receive filter and the second receive filter are disposed at the first major surface of the module substrate, and
the antenna switch and the matching switch are included in a single semiconductor integrated circuit (IC) disposed at the second major surface of the module substrate.

2. The radio-frequency module according to claim 1, wherein
the at least one of the inductor and the capacitor are disposed at the first major surface of the module substrate.

3. The radio-frequency module according to claim 2, wherein
from a plan view of the module substrate, the at least one of the inductor and the capacitor, and the matching switch at least partially coincide with each other.

4. The radio-frequency module according to claim 2, further comprising:
an external connection terminal disposed at the second major surface of the module substrate.

5. The radio-frequency module according to claim 4, further comprising:
a low-noise amplifier configured to amplify a receive signal in the first communication band, wherein
the low-noise amplifier is included in the single semiconductor IC.

6. The radio-frequency module according to claim 3, further comprising:
an external connection terminal disposed at the second major surface of the module substrate.

7. The radio-frequency module according to claim 6, further comprising:
a low-noise amplifier configured to amplify a receive signal in the first communication band, wherein
the low-noise amplifier is included in the single semiconductor IC.

8. The radio-frequency module according to claim 3, further comprising:
a low-noise amplifier configured to amplify a receive signal in the first communication band, wherein
the low-noise amplifier is included in the single semiconductor IC.

9. The radio-frequency module according to claim 2, further comprising:
a low-noise amplifier configured to amplify a receive signal in the first communication band, wherein
the low-noise amplifier is included in the single semiconductor IC.

10. The radio-frequency module according to claim 1, further comprising:
an external connection terminal disposed at the second major surface of the module substrate.

11. The radio-frequency module according to claim 10, further comprising:
a low-noise amplifier configured to amplify a receive signal in the first communication band, wherein
the low-noise amplifier is included in the single semiconductor IC.

12. The radio-frequency module according to claim 10, wherein
the matching switch is configured to
in response to a receive signal in the first communication band being solely received, enter an open state, and
in response to a receive signal in the first communication band and a receive signal in the second communication band being received simultaneously, enter a closed state.

13. The radio-frequency module according to claim 1, further comprising:
a low-noise amplifier configured to amplify a receive signal in the first communication band, wherein
the low-noise amplifier is included in the single semiconductor IC.

14. The radio-frequency module according to claim 13, further comprising:
a low-noise amplifier configured to amplify a receive signal in the first communication band, wherein
the low-noise amplifier is included in the single semiconductor IC.

15. The radio-frequency module according to claim 13, wherein
the matching switch is configured to
in response to a receive signal in the first communication band being solely received, enter an open state, and
in response to a receive signal in the first communication band and a receive signal in the second communication band being received simultaneously, enter a closed state.

16. The radio-frequency module according to claim 1, wherein
the matching switch is configured to
in response to a receive signal in the first communication band being solely received, enter an open state, and
in response to a receive signal in the first communication band and a receive signal in the second communication band being received simultaneously, enter a closed state.

17. The radio-frequency module according to claim 1, wherein
the first receive filter and the second receive filter are each configured to pass a receive signal in a receive band selected from Band 1, Band 3, Band 7, Band 40, and Band 41 of Long Term Evolution (LTE).

18. A communication device comprising:
an antenna;
a radio frequency signal processing circuit configured to process a radio-frequency signal received or to be transmitted by the antenna; and
a radio-frequency module configured to communicate the radio-frequency signal between the antenna and the radio frequency signal processing circuit, the radio-frequency module including
a module substrate having a first major surface and a second major surface on opposing sides of the module substrate,
an antenna connection terminal,
a first receive filter configured to pass a receive signal in a frequency band including a first communication band,
a second receive filter configured to pass a receive signal in a frequency band including a second communication band different from the first communication band,
an antenna switch configured to control connection and disconnection between the first receive filter and the antenna connection terminal and also control connection and disconnection between the second receive filter and the antenna connection terminal, and
a matching circuit coupled between the antenna connection terminal and the first receive filter, wherein
the matching circuit includes
at least one of an inductor and a capacitor, and
a matching switch configured to control connection and disconnection between the first receive filter and the at least one of the inductor and the capacitor,
the first receive filter and the second receive filter are disposed at the first major surface of the module substrate, and
the antenna switch and the matching switch are included in a single semiconductor integrated circuit (IC) disposed at the second major surface of the module substrate.

19. The communication device of claim 18, wherein
the at least one of the inductor and the capacitor are disposed at the first major surface of the module substrate.

* * * * *